(12) United States Patent
Yamazaki

(10) Patent No.: US 7,325,865 B2
(45) Date of Patent: Feb. 5, 2008

(54) VEHICLE REAR BODY STRUCTURE

(75) Inventor: Akihito Yamazaki, Zama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 66 days.

(21) Appl. No.: 11/293,100

(22) Filed: Dec. 5, 2005

(65) Prior Publication Data

US 2006/0119140 A1 Jun. 8, 2006

(30) Foreign Application Priority Data

Dec. 6, 2004 (JP) ............... 2004-352934

(51) Int. Cl.
*B62D 25/08* (2006.01)

(52) U.S. Cl. ............ 296/203.04; 296/193.02; 296/24.44; 296/29

(58) Field of Classification Search .......... 296/193.02, 296/193.08, 24.4, 24.43, 203.01, 203.04, 296/29, 30, 24.44

See application file for complete search history.

(56) References Cited

U.S. PATENT DOCUMENTS

| | | | | |
|---|---|---|---|---|
| 2,115,903 A | * | 5/1938 | Breer et al. | 296/203.01 |
| 2,148,950 A | * | 2/1939 | Maier | 296/203.01 |
| 2,198,653 A | * | 4/1940 | Breer et al. | 296/203.04 |
| 5,102,186 A | * | 4/1992 | Yoshii et al. | 296/203.04 |
| 5,123,696 A | * | 6/1992 | Watari | 296/203.04 |
| 5,603,853 A | * | 2/1997 | Mombo-Caristan | 219/121.64 |
| 6,113,180 A | * | 9/2000 | Corporon et al. | 296/203.04 |

FOREIGN PATENT DOCUMENTS

| | | | |
|---|---|---|---|
| JP | 62-008882 U | 1/1987 | |
| JP | 157278 | * 7/1991 | ............ 296/195 |
| JP | 2000-229584 A | 8/2000 | |
| JP | 2004-291771 A | 10/2004 | |

* cited by examiner

*Primary Examiner*—Dennis H. Pedder
(74) *Attorney, Agent, or Firm*—Foley & Lardner LLP

(57) ABSTRACT

A vehicle rear body structure including: a cross member provided beneath a rear parcel shelf to connect upper ends of rear suspension towers; a strip member provided along a rear edge of a floor panel; and panel members provided between the cross member and the strip member to connect the cross member and the strip member. The panel members include a center panel and a pair of side panels arranged on outer sides in a vehicle transverse direction of the center panel, respectively. Each of the side panels is joined along an inner edge in the vehicle transverse direction thereof to the center panel by a continuous welding.

2 Claims, 4 Drawing Sheets

VEHICLE REAR BODY STRUCTURE

BACKGROUND OF THE INVENTION

1. Field of Invention

The present invention relates to a vehicle rear body structure, and more particularly, to a vehicle body structure at the rear of a rear seat of a vehicle.

2. Description of Related Art

Japan Patent Application Laid-Open Publication No. 2000-229584 discloses a vehicle rear body structure in which a partition panel is provided at the rear of a rear seat for separating a passenger compartment from a rear space of the vehicle. The partition panel has an indented surface with a reinforcing bead in a V-shaped pattern as viewed from the front.

SUMMARY OF THE INVENTION

In the aforementioned vehicle rear body structure, the partition panel at the rear of the rear seat is formed of a large single panel member. The V-shaped reinforcing bead formed on the indented surface extends to a peripheral edge portion of the partition panel, and gives the peripheral edge portion in a complicated shape formed of a large number of plane elements crossing one another. Therefore, it is difficult to maintain the form accuracy of the partition panel when it is attached to a position. Accordingly special care has to be taken in task sequence and accuracy control, resulting in increased labor in manufacturing.

It is an object of the invention to provide a vehicle body structure at the rear of a rear seat of a vehicle, which allows the form accuracy of the respective members to be kept easily and rigidity of the vehicle body to be improved while saving the effort in the manufacturing.

An aspect of the present invention is a vehicle rear body structure comprising: a cross member provided beneath a rear parcel shelf to connect rear suspension towers; a strip member provided along a rear edge of a floor panel; and panel members provided between the cross member and the strip member to connect the cross member and the strip member, the panel members comprising a center panel and a pair of side panels arranged on outer sides in a vehicle transverse direction of the center panel, respectively, wherein each of the side panels is joined along an inner edge in the vehicle transverse direction thereof to the center panel by a continuous welding.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
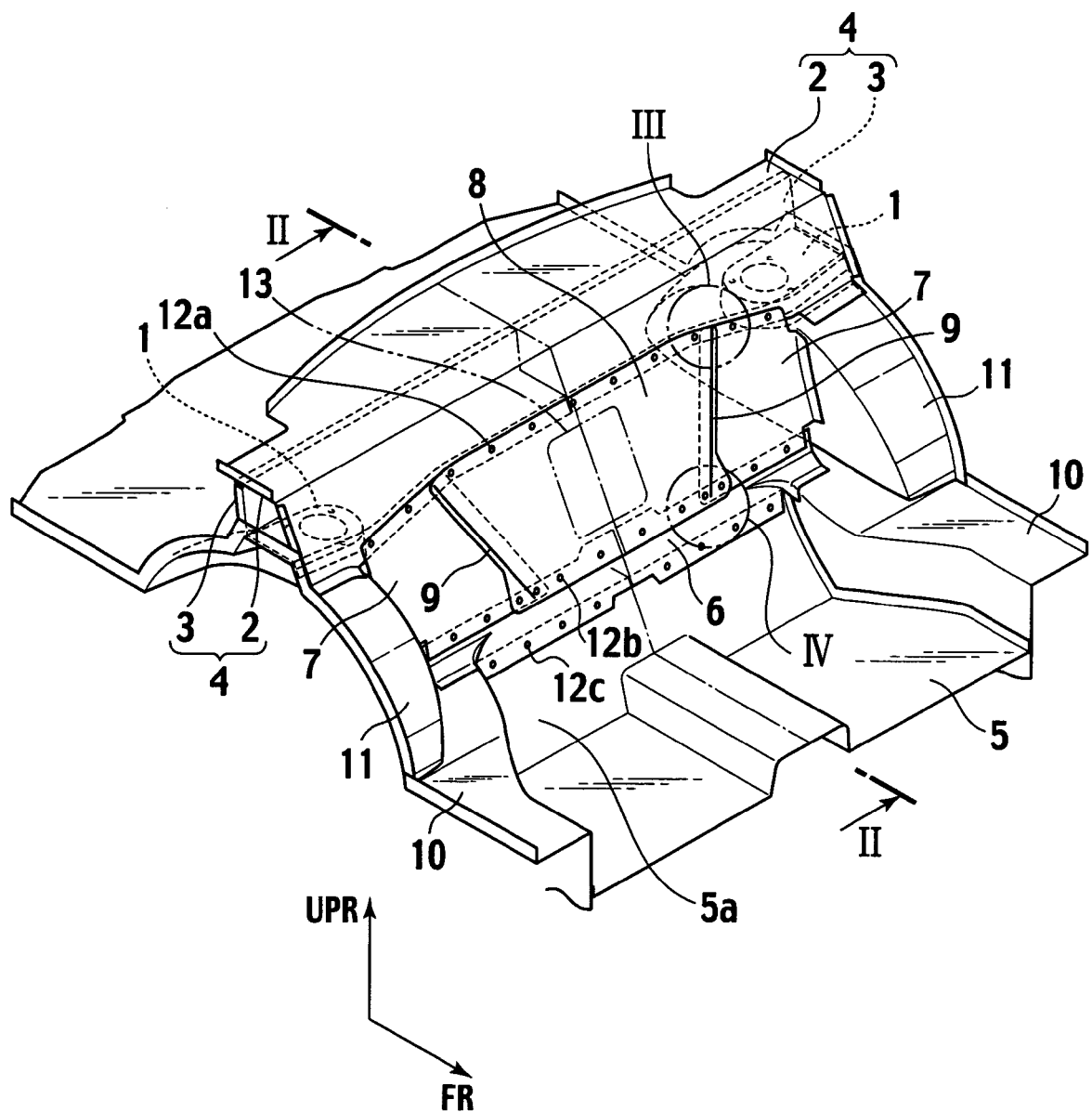
FIG. 1 is a perspective view of a vehicle rear body structure according to an embodiment of the invention.

An embodiment of the present invention will be explained below with reference to the drawings, wherein like members are designated by like reference characters. In the drawings, UPR represents a direction upward of the vehicle, and FR represents the front side in the longitudinal direction of the vehicle.

In a vehicle rear body structure according to the embodiment of the present invention, a box-section cross member 4 (hereinafter referred to as a parcel member 4) is provided beneath a rear parcel shelf to connect upper ends of rear suspension towers 1 (or strut towers) on both side rears of the vehicle body. The parcel member 4 is formed of a panel member 2 (hereinafter referred to as a parcel 2) extending in the vehicle transverse direction, having an L-shape in section including a horizontal upper wall and a front wall extending downward from a front edge of the upper wall, and a reinforcement panel member 3 (hereinafter referred to as a reinforcement parcel 3) attached to the parcel 2 at a lower side of the upper wall and a rear side of the front wall of the parcel 2.

A floor panel 5 is formed to have on a rear end portion thereof an inclined wall 5a extending obliquely upward at the rear of the vehicle rear seat. A transversely extending strip member 6 (hereinafter referred to as a seat back lower 6) extends along the upper and rear edge of the inclined wall 5a. The lower edge of the seat back lower 6 is laid on a front side of the upper and rear edge of the inclined wall 5a, and spot welded thereto at a plurality of weld spots 12c. The seat back lower 6 is disposed between side members 10 extending in the longitudinal direction at transversely outer sides of the vehicle, and welded at the transversely outer ends thereof to the side members 10.

Three partition panel members are provided side by side between the parcel member 4 and the seat back lower 6 to connect the parcel member 4 and the seat back lower 6. The partition panel members include two side panel members 7 (hereinafter referred to as seat back side panels 7) provided on both outer sides in the vehicle transverse direction and a center panel member 8 (hereinafter referred to as a seat back center panel 8) interposed between the two seat back side panels 7.

Figure 2:
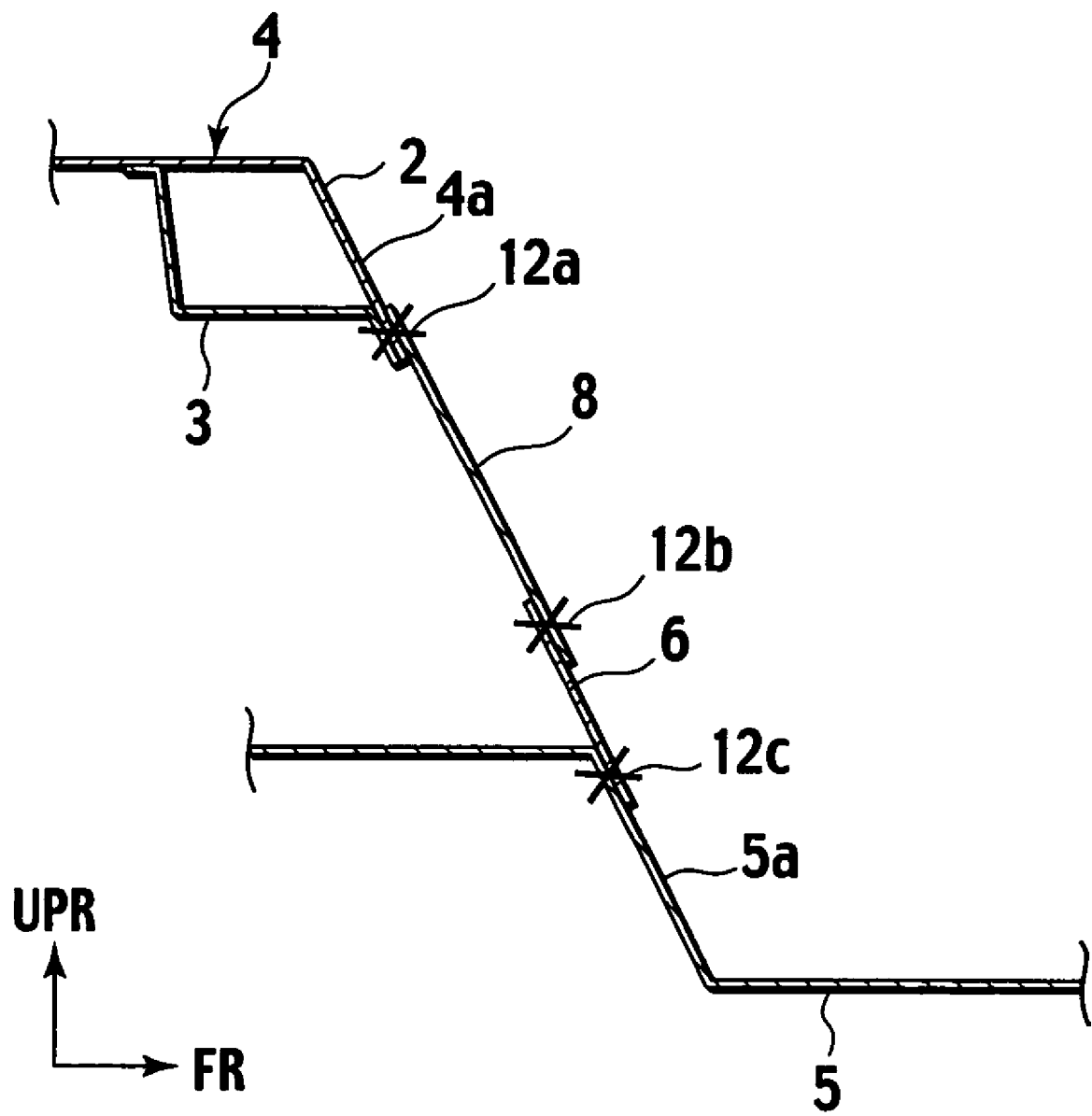
FIG. 2 is a cross sectional view of the vehicle rear body structure in a vehicle transverse direction taken along the line II-II of FIG. 1.

As illustrated in FIG. 2, a front side 4a of the parcel member 4, the seat back center panel 8 (or the seat back side panel 7), the seat back lower 6, and the front side of the inclined wall 5a of the floor panel 5 are joined to one another to collectively form a substantially planar surface, whereby positioning or joining of those members can be performed easily.

The upper edge of the seat back side panel 7 is laid on the front side of the lower edge of the front wall of the parcel 2 (parcel member 4) so as to be joined thereto by spot welding. The lower edge of the seat back side panel 7 is laid on the front side of the upper edge of the seat back lower 6 so as to be joined thereto by spot welding. The outer edges of the seat back side panels 7 in the vehicle transverse direction are joined to the lateral side of the rear wheelhouse 11 by spot welding.

Meanwhile the upper edge of the seat back center panel 8 is laid on the front side of the lower edge of the parcel member 4 so as to be joined thereto by spot welding. The lower edge of the seat back center panel 8 is laid on the front side of the upper edge of the seat back lower 6 so as to be joined thereto by spot welding.

The transversely outer edges of the seat back center panel 8 are respectively laid on front sides of the transversely inner edges of the seat back side panels 7 so as to be joined thereto at straight weld seams by a continuous welding (a laser welding, for example). The continuous welding increases the thickness of the welded portion, thereby enhancing the rigidity of the joined panel members as a whole. Each of the straight weld seams 9 (hereinafter referred to as continuously welded portions 9) between the seat back center panel 8 and the seat back side panels 7 serves as a straight reinforcing member connecting the parcel member 4 and the seat back lower 6. In the embodiment, the left and right continuously welded portions 9 are arranged in symmetry with respect to a vertical plane including a vehicle longitudinal axis through a center point in the vehicle transverse direction such that the horizontal distance therebetween becomes greater as it goes upward when viewed from the front, in order to enhance the torsion rigidity of the vehicle body.

Figure 3:
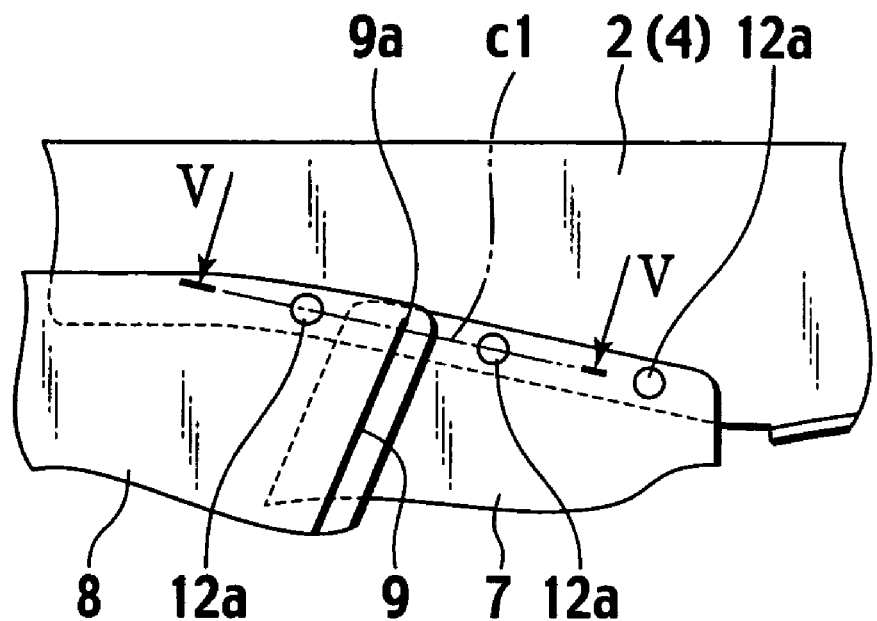
FIG. 3 is an enlarged view showing a portion III in FIG. 1 where a parcel member, and upper rear edges of seat back center panel and seat back side panel of the vehicle rear body structure meet.
Figure 4:
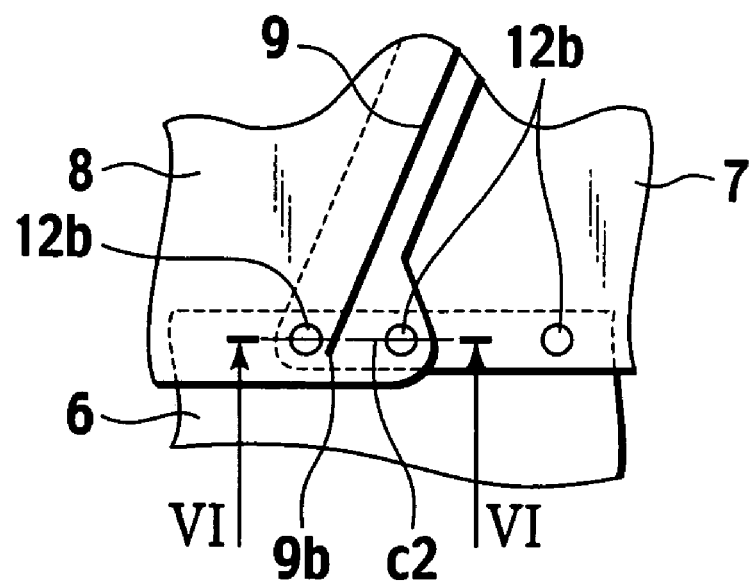
FIG. 4 is an enlarged view showing a portion IV shown in FIG. 1 where the parcel member, and lower front edges of the seat back center panel and seat back side panel of the vehicle rear body structure meet.

As shown in FIG. 3, an upper end 9a of the continuously welded portion 9 is positioned above a centerline c1 (a line passing through each center of a plurality of weld spots 12a) of the weld spots 12a where the seat back side panels 7 and the seat back center panel 8 are welded to the parcel member 4. Meanwhile as shown in FIG. 4, a lower end 9b of the continuously welded portion 9 is positioned below a centerline c2 (a line passing through each center of the plurality of weld spots 12b) of the weld spots 12b where the seat back side panels 7 and the seat back center panel 8 are welded to the seat back lower 6.

The continuous welding is applied across the centerlines c1 and c2, that is, the continuous welding ranges from the position 9a close to the upper edges of the seat back side penal 7 and the seat back center panel 8 and above the centerline c1, to the position 9b close to the lower edges of the seat back side panel 7 and the seat back center panel 8 and below the centerline c2, and is thoroughly applied to the region defined by the centerlines c1 and c2. The continuously welded portion 9 is thus formed between the parcel member 4 and the seat back lower 6 to connect the parcel member 4 and the seat back lower 6, providing an enhanced rigidity and reinforcement of the structure.

Figure 5:
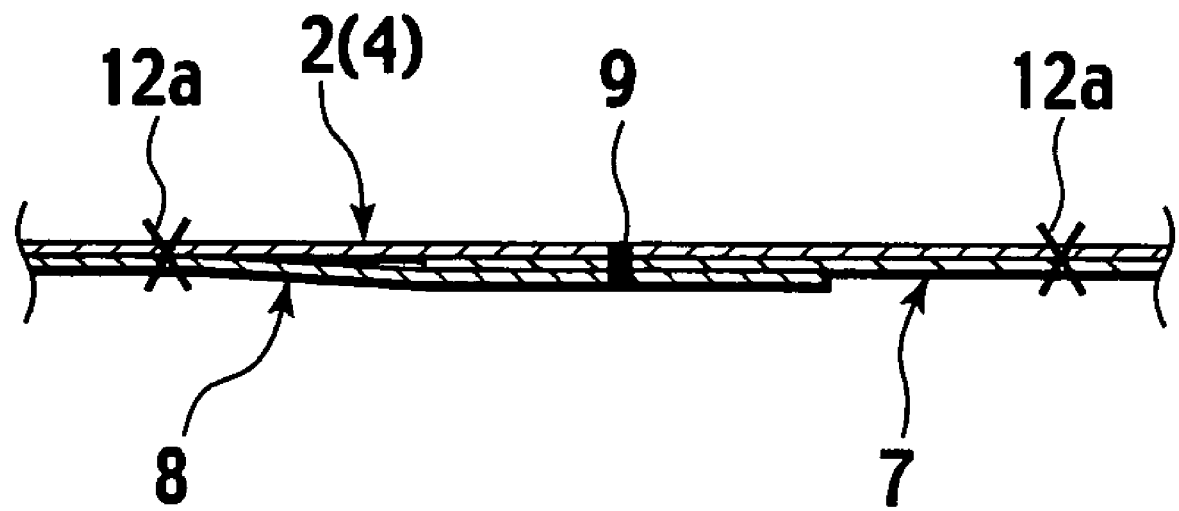
FIG. 5 is a cross sectional view taken along the line V-V of FIG. 3.

As shown in FIG. 5, the continuously welded portion 9 appears on the section along the centerline c1. The continuously welded portion 9 applied across the centerline c1 allows the joint of the seat back side panels 7 and the seat back center panel 8 to the parcel member 4 along the centerline c1 to be strengthened. If the continuously welded portion 9 is not applied across the centerline c1, the parcel member 4 is the only member connecting the two weld spots 12a adjacent to the continuously welded portion 9. Such portion may have the rigidity lower than that of the other portion. In the embodiment, however, no lowering in the rigidity as described above occurs.

Figure 6:
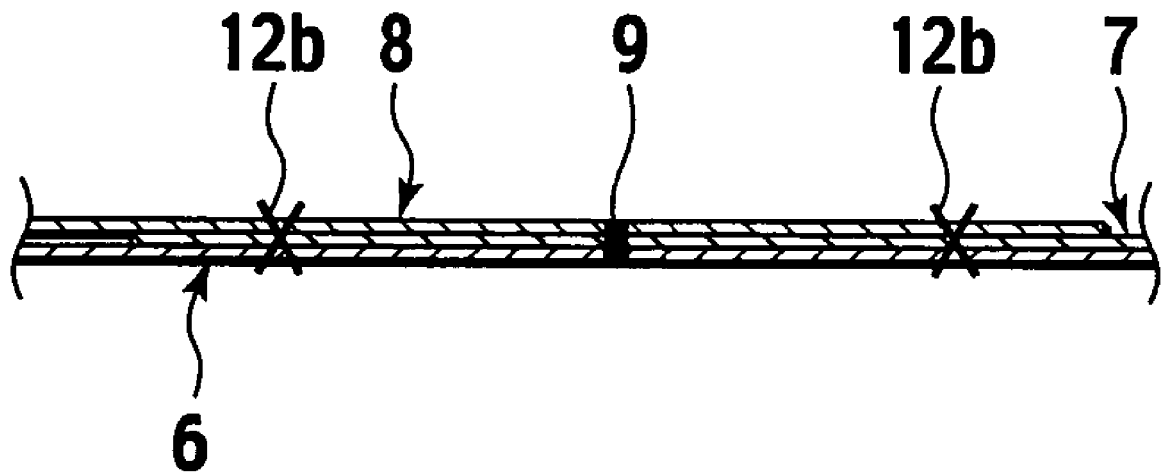
FIG. 6 is a cross sectional view taken along the line VI-VI of FIG. 4.

As shown in FIG. 6, the continuously welded portion 9 appears on the section along the centerline c2. The continuously welded portion 9 applied across the centerline c2 allows the joint of the seat back side panels 7 and the seat back center panel 8 to the seat back lower 6 along the centerline c2 to be strengthened. Three partition panel members of the seat back side panel 7, the seat back center panel 8, and the seat back lower 6 are joined to one another at the two weld spots 12b adjacent to the continuously welded portion 9, thus enhancing the joint strength thereof.

In this case, the continuously welded portion 9 serves to further enhance the joint strength.

In the present embodiment, a partition panel is formed of the three separate plate members, that is, two seat back side panels 7 and the seat back center panel 8. The seat back side panel 7 is joined at the transversely inner edge thereof to the seat back center panel 8 by a continuous welding. The region to which the continuous welding is applied (the continuously welded portion 9) serves to enhance the rigidity of the entire structure. Compared with the case where a single panel member with a patterned indented surface is employed as the partition panel, the rear body structure according to the present invention can maintain the higher form accuracy, thus reducing the labor of assembly.

In the present embodiment, the continuous welding is applied for joining the seat back side panel 7 and the seat back center panel 8 and the weld seam thereof extends to a position close to the upper edges of the panels 7 and 8 and above the centerline c1 passing through the center points of the weld spots 12a. The continuously welded portion 9 reaching the parcel member 4 forms a continuous rigid member through which the stress can be effectively transferred, thus further improving the rigidity of the vehicle body.

In the embodiment, the continuous welding is applied for joining the seat back side panel 7 and the seat back center panel 8 and the weld seam thereof extends to the position close to the lower edges of the panels 7 and 8 and below the centerline c2 passing through the center points of the weld spots 12b. The continuously welded portion 9 reaching the seat back lower 6 forms a continuous rigid member through which the stress can be effectively transferred, thus further improving the rigidity of the vehicle body.

In the present embodiment, the two continuously welded portions 9 are thus connected to both the parcel member 4 and the seat back lower 6. Even in the case where an opening 13 (see FIG. 1) is formed on the seat back center panel 8 in an area thereof between the two continuously welded portions 9 in order to provide a ski-through or to reduce weight, the rigidity of the vehicle body is not substantially reduced. In this case, the seat back center panel 8 is the only member to be changed, while the seat back side panels 7 and other members can be used as they are. Therefore, the modification can be easily done at the lower cost compared with the case in which the partition panel is changed as a whole.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2004-352934, filed on Dec. 6, 2004, the disclosure of which is expressly incorporated herein by reference in its entirety.

What is claimed is:

1. A vehicle rear body structure comprising:
   a cross member provided beneath a rear parcel shelf to connect rear suspension towers;
   a strip member provided along a rear edge of a floor panel; and
   panel members provided between the cross member and the strip member to connect the cross member and the strip member, the panel members comprising a center panel and a pair of side panels arranged on outer sides in a vehicle transverse direction of the center panel, respectively, wherein each of the side panels is joined along an inner edge in the vehicle transverse direction thereof to the center panel by a continuous welding, the center panel and the side panels are spot welded to the cross member with a plurality of first weld spots arranged in a longitudinal direction of the cross member; and the continuous welding between a side panel and the center panel forms a continuously welded portion crossing a line passing through the first weld spots.

2. A vehicle rear body structure comprising:

a cross member provided beneath a rear parcel shelf to connect rear suspension towers;

a strip member provided along a rear edge of a floor panel; and panel members provided between the cross member and the strip member to connect the cross member and the strip member, the panel members comprising a center panel and a pair of side panels arranged on outer sides in a vehicle transverse direction of the center panel, respectively, wherein each of the side panels is joined along an inner edge in the vehicle transverse direction thereof to the center panel by a continuous welding, the center panel and the side panels are spot welded to the strip member with a plurality of weld spots arranged in a longitudinal direction of the strip member; and a continuous welding between a side panel and the center panel forms a continuously welded portion crossing a line passing through the weld spots.

* * * * *